United States Patent
Yeh et al.

(10) Patent No.: US 9,785,005 B2
(45) Date of Patent: Oct. 10, 2017

(54) TOUCH DISPLAY PANEL AND FABRICATING METHOD THEREOF

(71) Applicant: Au Optronics Corporation, Hsinchu (TW)

(72) Inventors: Chia-Chun Yeh, Taipei (TW); Yu-Feng Chien, New Taipei (TW); Wen-Rei Guo, Miaoli County (TW); Hung-Wen Chou, Taoyuan (TW); Chin-Chuan Liu, New Taipei (TW); Po-Yuan Liu, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 58 days.

(21) Appl. No.: 14/968,866

(22) Filed: Dec. 14, 2015

(65) Prior Publication Data
US 2016/0116779 A1   Apr. 28, 2016

Related U.S. Application Data

(63) Continuation of application No. 13/584,767, filed on Aug. 13, 2012, now abandoned.

(30) Foreign Application Priority Data

May 11, 2012   (TW) .............................. 101116908 A

(51) Int. Cl.
| | | |
|---|---|---|
| G02F 1/1362 | (2006.01) | |
| G02F 1/1333 | (2006.01) | |
| G06F 3/044 | (2006.01) | |
| G02F 1/1335 | (2006.01) | |
| G06F 3/041 | (2006.01) | |

(52) U.S. Cl.
CPC .... *G02F 1/13338* (2013.01); *G02F 1/133345* (2013.01); *G02F 1/133512* (2013.01); *G02F 1/133514* (2013.01); *G02F 1/136209* (2013.01); *G06F 3/044* (2013.01); *G06F 3/0412* (2013.01); *G06F 2203/04103* (2013.01)

(58) Field of Classification Search
CPC . G02F 1/136209; G02F 1/13338; G06F 3/044
See application file for complete search history.

(56) References Cited

U.S. PATENT DOCUMENTS

| | | | | |
|---|---|---|---|---|
| 2011/0267289 A1* | 11/2011 | Park | ........................ | G06F 3/044 345/173 |
| 2013/0044074 A1* | 2/2013 | Park | .................... | G02F 1/13338 345/174 |

* cited by examiner

*Primary Examiner* — Kendrick Hsu
(74) *Attorney, Agent, or Firm* — Jianq Chyun IP Office

(57) ABSTRACT

A touch display panel including an active device array substrate, an opposite substrate and a liquid crystal layer is provided. The active device array substrate includes a first substrate, a black matrix, a touch-sensing device layer, a dielectric layer and an active device array layer. The black matrix is disposed on the first substrate. The touch-sensing device layer is disposed on the first substrate to cover a portion of the black matrix. The dielectric layer covers the touch-sensing device layer. The active device array layer is disposed on the dielectric layer. The touch-sensing device layer and the active device array substrate are located at two opposite sides of the dielectric layer. The liquid crystal layer is disposed between the active device array layer and the opposite substrate. Moreover, a fabricating method of the touch display panel is also provided.

7 Claims, 8 Drawing Sheets

TOUCH DISPLAY PANEL AND FABRICATING METHOD THEREOF

CROSS-REFERENCE TO RELATED APPLICATION

This application is a continuation application of and claims the priority benefit of a prior application Ser. No. 13/584,767, filed on Aug. 13, 2012, now pending. The prior application Ser. No. 13/584,767 claims the priority benefit of Taiwan application serial no. 101116908, filed on May 11, 2012. The entirety of each of the above-mentioned patent applications is hereby incorporated by reference herein and made a part of this specification.

BACKGROUND OF THE DISCLOSURE

Technical Field

The disclosure is related to a touch display panel and a fabricating method thereof, and more particularly to an in-cell type touch display panel and the fabricating method thereof.

Description of Related Art

Along with the daily advancement of the display technology, people's life is made more convenient through the aid of the display. With the demands for lightweight and thin characteristics of the display, the flat panel display (FPD) has become the mainstream of present days. In the recent years, various electronic products characterized in simple operation, small volume and large screen size are developed, and particularly the demands of the small volume and large screen size for the portable electronic products are stricter. Therefore, many electronic products integrate the touch interface together with the display panel to save the space required by the keyboard or buttons, resulting in greater screen size.

The touch display panel can be categorized into resistance touch display panels, capacitive touch display panels, optical touch display panels, surface acoustic wave touch display panels, and electromagnetic touch display panel according to the differences in their sensing methods. The capacitive type touch display panel has quick response time, reliable, durable, and other advantages, therefore, the capacitive touch display panels are widely adapted to the electronic products. According to the different structure and fabricating method, the touch display panel can also be categorized into added-on, on-cell/in-cell, and one glass solution (OGS).

FIG. 1 is a diagram of fabricating method of the conventional touch display panel. Referring to FIG. 1, the touch display panel includes a liquid crystal display module 10 and a touch panel 20. The liquid crystal display module 10 includes a color filter substrate 1, an active device array substrate 2, and a backlight module 3. In general, a frame 4 may be used to integrate the color filter substrate 1, the active device array substrate 2, and a backlight module 3 to form the liquid crystal display module 10. Conventionally, an active device array layer and an outer lead bonding area are fabricated on the active device array substrate 2, wherein the outer lead bonding area is configured to connect a display driving circuit 5. The frame 4 surrounds the display driving circuit 5. The display driving circuit 5 is a chip, and causes the liquid crystal display module 10 to have an uneven surface after the display driving circuit 5 is mounted on the outer lead bonding area of the active device array substrate 2, shown by the dotted line P in FIG. 1. As a result, when the touch panel 20 is attached to the liquid crystal display module 10, the difficulty of the attaching fabrication process increases due to the uneven surface of the liquid crystal module 10. Moreover, the touch display panel 20 has protection cover that is disposed at the outermost layer, and configured to protect the touch-sensing layer. Accordingly, additional fabrication process step is required to attach the protection cover, thus likely to affect the yield of the fabrication process.

SUMMARY OF THE DISCLOSURE

The disclosure provides a touch display panel and a fabricating method thereof. In the touch display, a touch-sensing device layer and an active device array layer are integrated on the same substrate.

The disclosure provides a touch display panel including an active device array substrate, an opposite substrate, and a liquid crystal layer. The active device substrate includes a first substrate, a black matrix, a touch-sensing device layer, a dielectric layer, and an active device array layer. The black matrix is disposed on the first substrate. The touch-sensing device layer is disposed on the first substrate to cover a portion of the black matrix. The dielectric layer covers the touch-sensing device layer. The active device array layer is disposed on the dielectric layer. The touch-sensing device layer and the active device array layer are located at two opposite sides of the dielectric layer. The liquid crystal layer is disposed between the active device array layer and the opposite substrate.

According to an embodiment of the disclosure, the opposite substrate includes a second substrate, a color filter layer, and a common electrode, wherein the color filter layer is disposed on the second substrate, the common electrode is disposed over the color filter layer, and the common electrode and the second substrate are located at two opposite sides of the color filter layer.

According to an embodiment of the disclosure, the active device array layer includes a plurality of pixels arranged in an array, a plurality of scan lines, and a plurality of data lines. Each of the pixels is electrically connected to the corresponding scan lines and data lines respectively, wherein the black matrix includes a mesh pattern and a frame pattern, the frame pattern surrounds the mesh pattern, and the mesh pattern is distributed corresponding to the scan lines and the data lines.

According to an embodiment of the disclosure, the touch display panel further includes a display driving circuit, and the display driving circuit is disposed on the black matrix.

According to an embodiment of the disclosure, the touch display panel further includes a backlight module, wherein the backlight module is disposed at one side of the opposite substrate, and the backlight module and the active device array substrate are located at the two opposite sides of the opposite substrate.

A fabricating process of a display touch panel provided by the disclosure, which includes the following steps, forming a black matrix, a touch-sensing device layer, a dielectric layer, and an active device array layer sequentially on a first substrate to form an active device array substrate. The active device array substrate is bonded to an opposite substrate. And, a liquid crystal layer is formed between the active device array layer and the opposite substrate.

According to an embodiment of the disclosure, the fabricating method of the opposite substrate includes, forming a color filter layer and a common electrode sequentially over a second substrate.

According to an embodiment of the disclosure, the fabricating method of the active device array layer includes, forming a plurality of pixels arranged in an array, a plurality of scan lines, and a plurality of data lines on the dielectric layer, wherein each of the pixels is electrically connected to the corresponding scan lines and the data lines respectively. The black matrix includes a mesh pattern and a frame pattern, the frame pattern surrounds the mesh pattern, and the mesh pattern is distributed corresponding to the scan lines and the data lines.

According to an embodiment of the disclosure, the fabricating method of the touch display panel further includes, providing a display driving circuit, and the display driving circuit is disposed on the black matrix.

According to an embodiment of the disclosure, the fabricating method of the touch display panel further includes, providing a backlight module, and the backlight module is disposed at one side of the opposite substrate, so the backlight module and the active device array substrate are located at two opposite sides of the opposite.

Base on the above, the disclosure integrates the touch-sensing device layer, black matrix, and the active device array layer on the same substrate to further reduce the thickness and weight of the touch display panel.

In order to make the aforementioned and other features and advantages of the invention comprehensible, several exemplary implementations accompanied with figures are described in detail below.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

The First Embodiment

Figure 3:
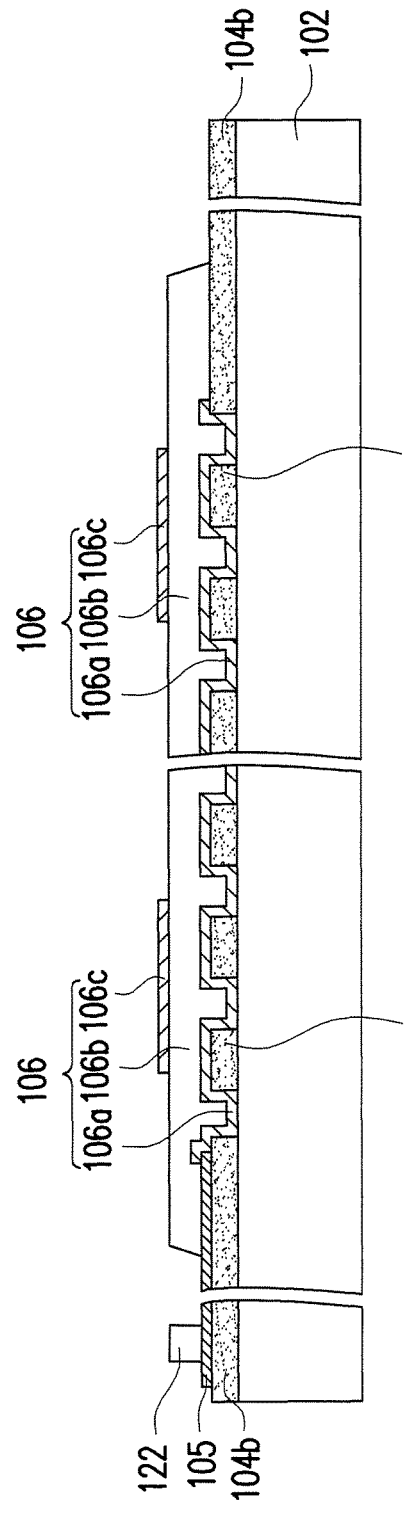
Figure 4:
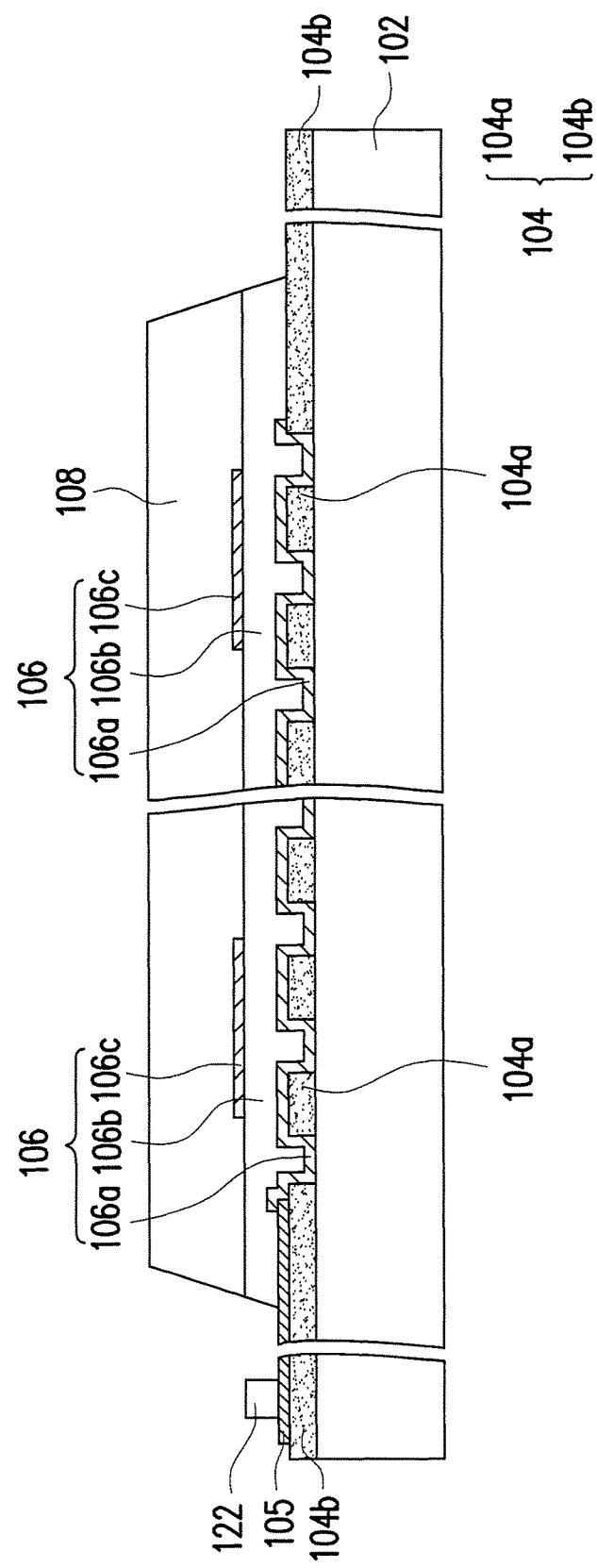
Figure 5:
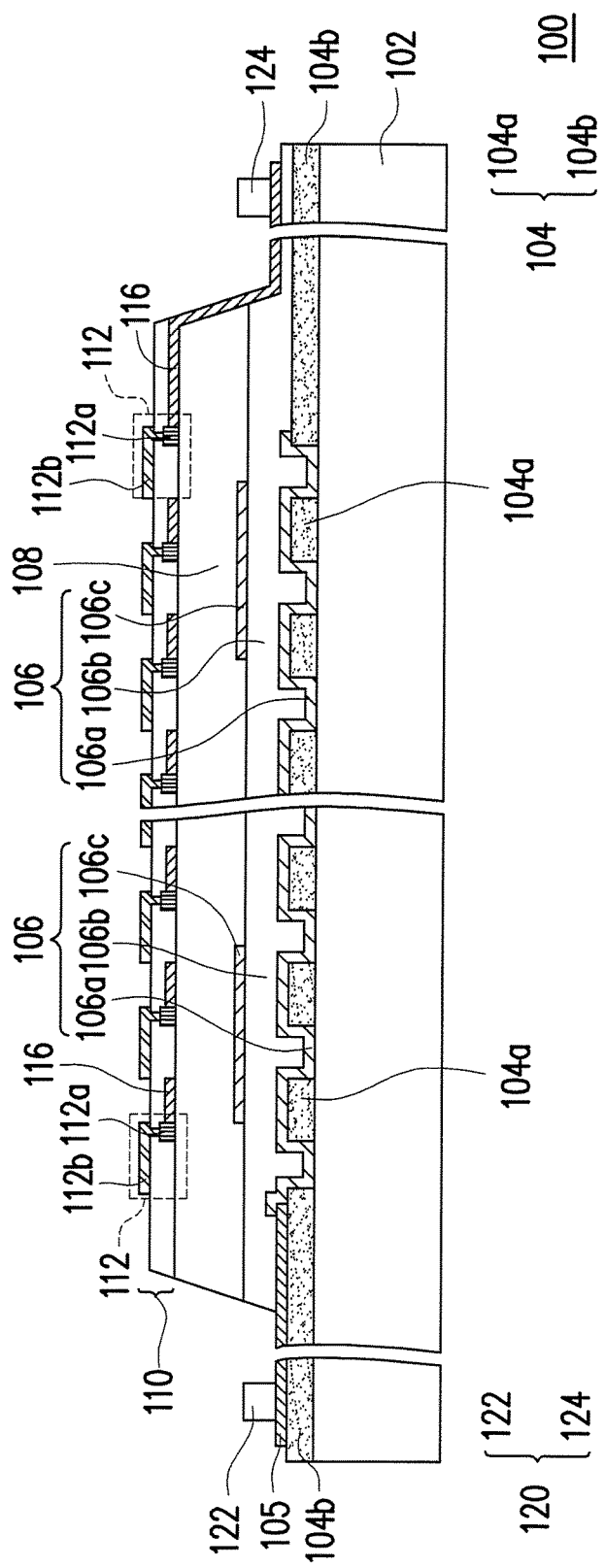
Figure 6:
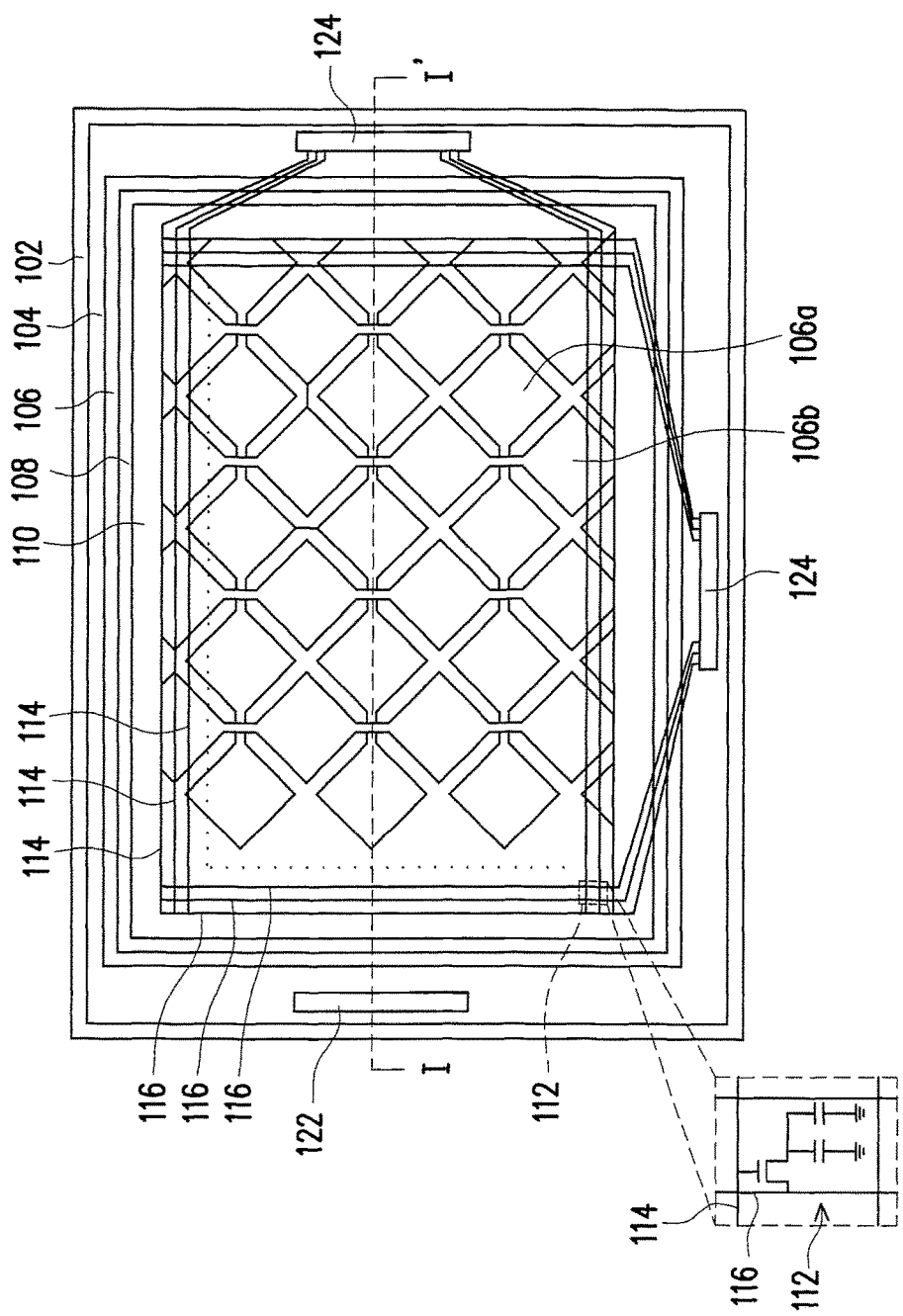
FIG. 6 is a schematic top view of an active device array substrate according to the first embodiment of the invention.

FIG. 2 to FIG. 5 are schematic diagrams of a fabricating method of a touch display panel according to a first embodiment of the invention, FIG. 6 is a schematic top view of an active device array substrate according to the first embodiment of the invention, wherein the FIG. 5 is schematic cross-sectional view of FIG. 6 along a profile line I-I'. In FIG. 6, some films are omitted.

Figure 1:
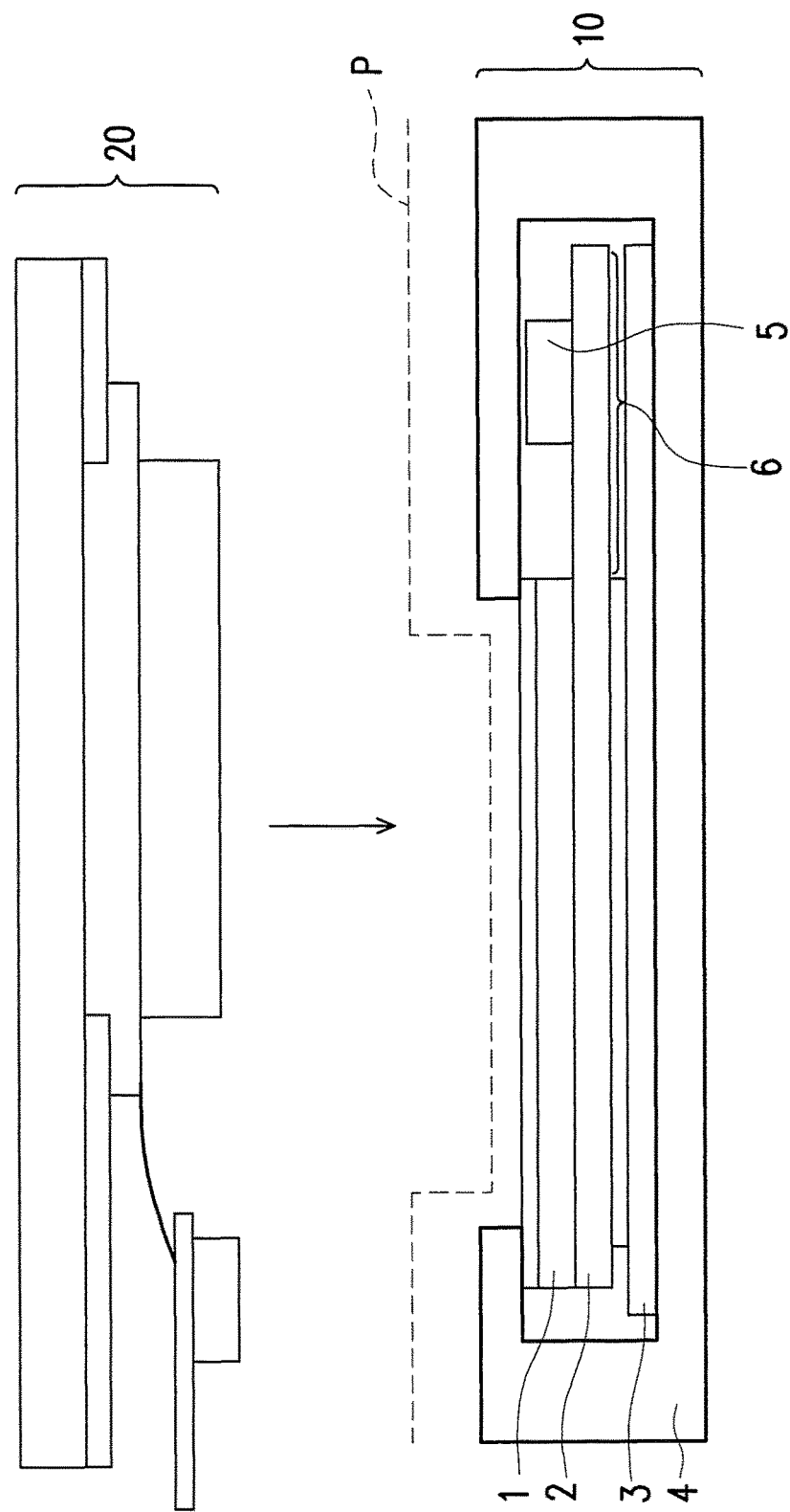
FIG. 1 is a schematic diagram of a fabricating method of a touch display panel according to the conventional technology.
Figure 2:
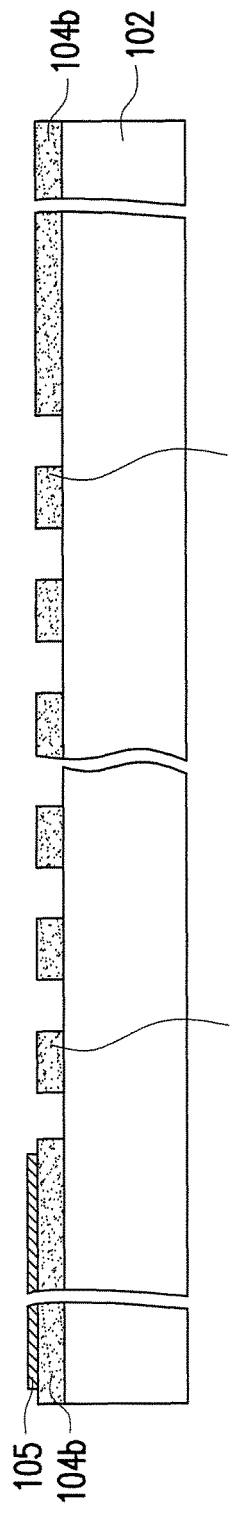
FIG. 2 to FIG. 5 are schematic diagrams of a fabricating method of a touch display panel according to a first embodiment of the invention.

Referring to FIG. 2, a first substrate 102 is provided. The first substrate 102 is mainly configured to carry devices or films. The first substrate 102 may be made of glass, quartz, an organic polymer, or other appropriate translucent materials, for example. In the present embodiment, the first substrate 102 also acts as a cover plate with protecting function. The first substrate 102 configured to carry devices and acting as a cover plate can save costs during fabrication and reduce the thickness of the touch display panel.

Then, a black matrix 104 is formed on the first substrate 102. The black matrix 104 includes a mesh pattern 104a and a frame pattern 104b, wherein the frame pattern 104b surrounds the mesh pattern 104a.

Then, a circuit layer 105 is formed on the frame pattern 104b of the black matrix 104. The material of the circuit layer 105 may be, for example, metal materials, an alloy, metal nitride, metal oxide, metal oxynitride, or other appropriate materials. In an alternative embodiment, the circuit layer 105 may be a stacked structure of a metal layer and other conductive layer.

Referring to FIG. 3, a touch-sensing device layer 106 is formed. The touch-sensing device layer covers a portion of the black matrix 104. The fabricating method of the touch-sensing device layer 106 is to form a plurality of first sensing series 106a on the first substrate 102 first. The first sensing series 106a cover a portion of the circuit layer 105, and are electrically connected to the circuit layer 105. Then, an insulation layer 106b is formed on the first sensing series 106a. Next, a plurality of second sensing series 106c are formed on the insulation layer 106b. The first sensing series 106a and the second sensing series 106c are interlaced to each other; wherein the insulation layer 106b may be configured to electrically insulate the first sensing series 106a from the second sensing series 106c.

Then, a touch-sensing driving circuit 122 is disposed on the circuit layer 105. The sensing driving circuit 122 is electrically connected with touch-sensing device layer 106 though the circuit layer 105. According to the present embodiment, the first sensing series 106a and the second sensing series 106c may be configured to detect a position that is touched by a user, and transmit the sensing signal to the touch-sensing driving circuit 122.

Referring to FIG. 4, a dielectric layer 108 is formed on the touch-sensing device layer 106. The dielectric layer 108 may be made of, for example, organic materials, silicon based materials, or other materials with low dielectric constants. The dielectric layer 108 is composed of materials with low dielectric constant, hence the signal interference problem can be improved.

Referring to FIG. 5, an active device array layer 110 is foamed on the dielectric layer 108. At this time, the fabrication of the active device array substrate 100 is completed. Referring to the FIG. 5 and FIG. 6, the fabricating method of the active device array layer 110 is to form a plurality of pixels 112 arranged in an array, a plurality of scan lines 114, and a plurality of data lines 116 on the dielectric layer 108 first. Each of the pixels 112 includes at least one active device 112a and a pixel electrode 112b. The active device 112a may be a bottom gate thin film transistor or a top gate thin film transistor, which includes a gate, a channel, a source, and a drain. Each of the pixels 112 is electrically connected to the corresponding scan lines 114 and the data lines 116 through the active device 112a.

Base on the description above, the scan line 114 and the data line 116 are made of metal materials, for example. However, the embodiment of the invention is not limited thereto. According to other exemplary embodiments, the scan lines and the data lines may be made of other conductive materials, such as alloys, metal nitride, metal oxide, metal oxynitride, or other appropriate materials. In an alternative embodiment, the scan lines and the data lines may be a stacked structure of a metal layer and other conductive layer.

It should be noted that the scan lines 114 and the data lines 116 have possibilities of reflecting light, therefore the mesh pattern 104a of the black matrix 104 is distributed corresponding to the scan line 114 and the data line 116, and to cover the scan line 114 and the data line 116. For example, the vertical projection pattern of the mesh pattern 104a on the first substrate 102 physically overlaps the vertical projection of the scan lines 114 and the data lines 116 on the first substrate 102. Preferably, the vertical projection of the mesh pattern 104a on the first substrate 102 is slightly greater than the vertical projection pattern of the scan lines and data lines 116 on the first substrate 102. The width of the mesh pattern 104a, for example, substantially equals to the widths of the scan lines 114 and the data lines 116, or the width of the mesh pattern 104a, for example, is slighter greater than the widths of the scan lines 114 and data lines 116. In other words, the principle is for the width of the mesh pattern 104a to be able to cover the width of the scan lines 114 and the data lines 116. As a result, the black matrix 104 is able to cover the reflection caused by the scan lines 114 and the data lines 116.

Then, a display driving circuit 124 is disposed on the black matrix 104, which is disposed on the first substrate 102, wherein the display driving circuit 124 may electrically connected with the scan lines 114 and/or the data lines 116 of the active device array layer 110. In the present embodiment, the display driving circuit 124 is disposed on the first substrate 102, and the touch-sensing device layer 106 and the dielectric layer 108 are not between the display driving circuit 124 and the first substrate 102. However, the embodiment of the invention is not limited thereto. The touch-sensing driving circuit 122 is disposed on the first substrate 102, and the black matrix 104 and the circuit layer 105 is between the touch-sensing driving circuit 122 and the first substrate 102. In the present embodiment, the touch-sensing driving circuit 122 and the display driving circuit 124 constitutes a control circuit 120. For example, the touch-sensing driving circuit 122 and the display driving circuit 124 may be integrated in a single chip, or fabricated in different chips respectively. When the touch-sensing driving circuit 122 and the display driving circuit 124 are integrated in a single chip, the single chip functions as the aforementioned control circuit 120. When the touch-sensing driving circuit 122 and the display driving circuit 124 are fabricated in different chips respectively, the chips functions as the aforementioned control circuit 120.

Figure 7:
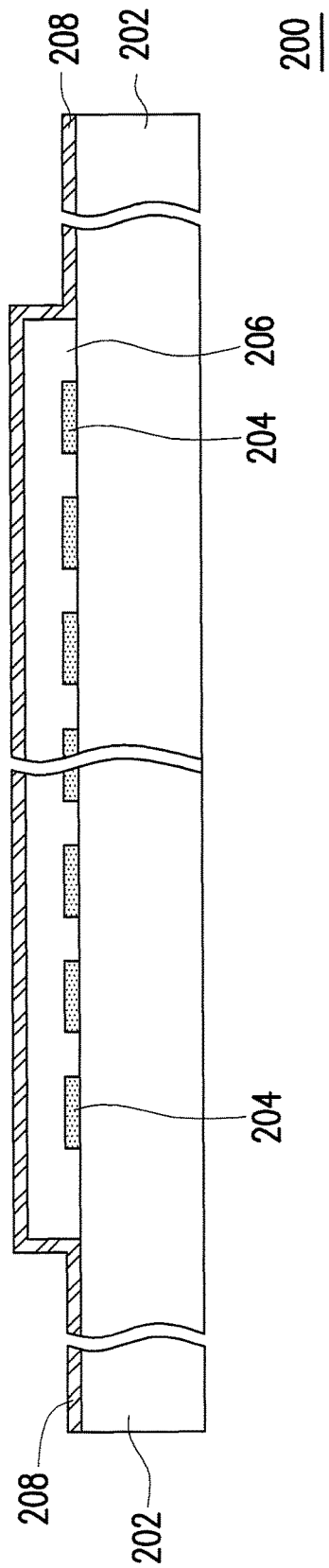
FIG. 7 to FIG. 8 are schematic diagrams of fabricating process of the touch display panel according to a first embodiment of the invention.
Figure 8:
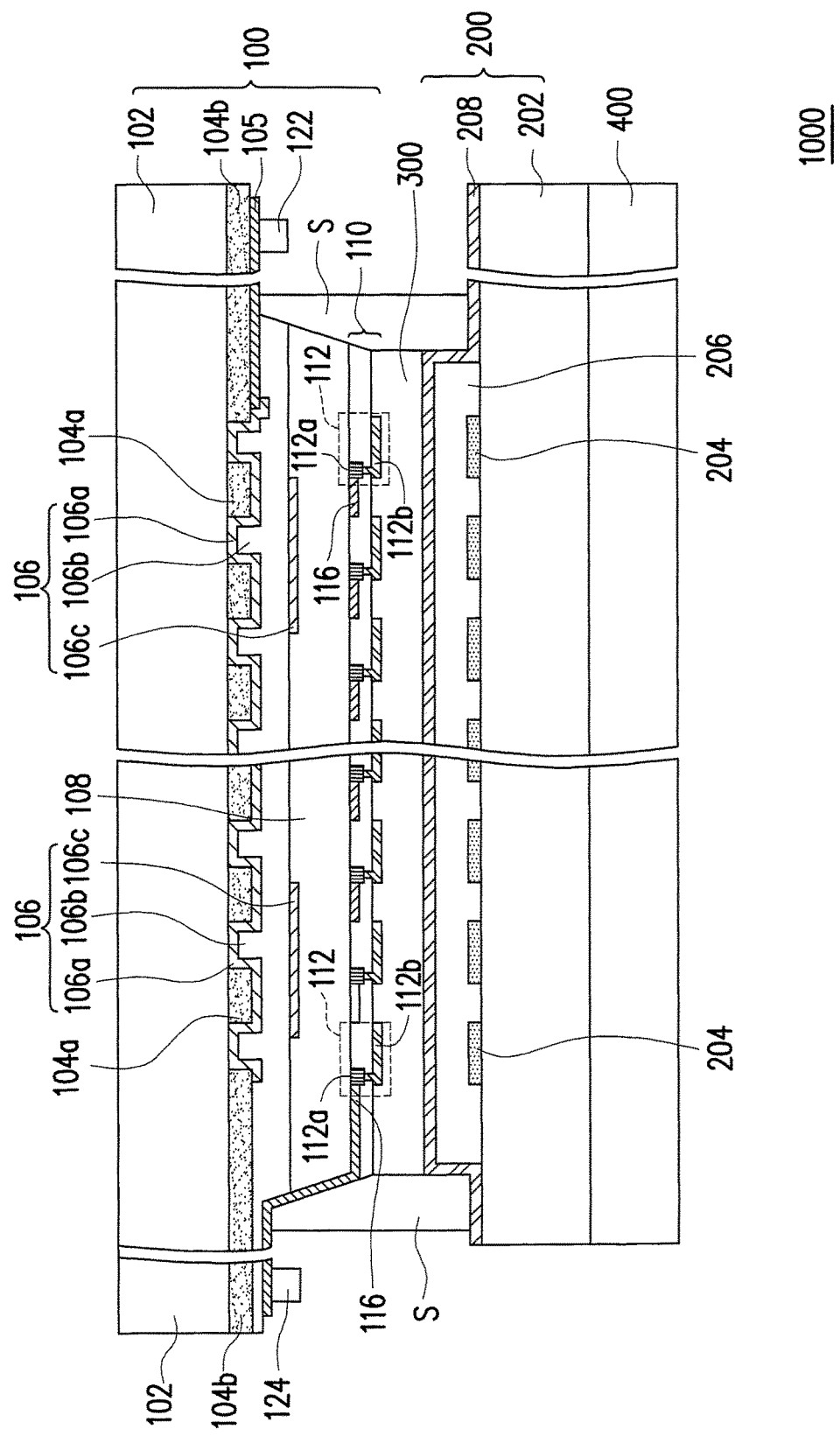

FIG. 7 and FIG. 8 are schematic diagrams of fabrication process of touch display panel according to the first embodiment of the invention. Referring to FIG. 7, a second substrate 202 is provided. The second substrate 202 is mainly configured to carry devices or films, which may be made of glass, quartz, an organic polymer, or other appropriate translucent materials, opaque/reflective materials (i.e. a conductive materials, metal, wafer, ceramic, or other appropriate materials), or other appropriate materials.

Then, a color filter layer 204 is formed on the second substrate 202. The color filter layer 204 may include a plurality of color filter patterns. The color filter patterns include a first color filter pattern, a second color filter pattern, and a third color filter pattern, for example. The color filter patterns are arranged in an array. The color filter layer 204 may be formed by printing, for example. In general, the color filter layer 204 may further include the black matrix disposed between the color filter patterns. Nevertheless, in the present embodiment, the black matrix 104 is disposed on the active device array substrate 100. Therefore, the black matrix 104 is not required to be disposed between every color filter patterns.

Base on the above description, in the color filter layer 204 of the present embodiment, each of the color filter patterns are disposed with space between each other. However, the embodiment of invention is not limited thereto. In other embodiment, each of the color filter patterns may be disposed consecutively without space between each other. The transition region of each color filter patterns may be covered by the black matrix 104 on the first substrate 102.

Then, a protection layer 206 is formed on the color filter layer 204. For example, the protection layer 206 covers the second substrate 202 and the color filter layer 204 entirely. The material of the protection layer 206, for example, include inorganic dielectric materials (such as silicon oxide, silicon nitride, silicon oxynitride, or other appropriate inorganic dielectric materials), or organic dielectric materials.

Then, a common electrode 208 is formed over the protection layer 206. The common electrode 208 covers the color filter layer 204. Furthermore, the common electrode 208 is, for example, a transparent conductive material. The transparent conductive material is, for example, indium tin oxide, indium zinc oxide, or other appropriate transparent conductive materials. At this time, the fabrication of an opposite substrate 200 of touch display panel 1000 is completed.

Referring to FIG. 8, the active device array substrate 100 is bonded with the opposite substrate 200. In detail, a sealant S and a liquid crystal layer 300 are provided between the active device array substrate 100 and the opposite substrate 200. Afterward, the active device array substrate 100 and the opposite substrate 200 are bonded with each other. According to the present embodiment, the orientation of the liquid crystal layer 300 may be, for example, in plane switching (IPS) type, twisted nematic (TN) type, and vertical alignment (VA) type.

Afterward, a backlight module 400 is provided, wherein the backlight module 400 is disposed at one side of the opposite substrate 200, and the backlight module 400 and the active device array substrate 100 are located at two opposite sides of the opposite substrate 200, respectively. The backlight module 400 may be configured to provide light for display, the backlight module 400 may be, for example, an edge type backlight module or a direct type backlight module.

It should be noted that the touch-sensing driving circuit 122 and the display driving circuit 124 are disposed on the black matrix 104 in the present embodiment, and the touch-sensing device layer 106, the black matrix 104, and the active device array layer 110 are disposed over the substrate 102 and located at one surface of the substrate 102 such that the touch-sensing device layer 106, the black matrix 104, and the active device array layer 110 are sandwiched between the substrate 102 and the opposite substrate 200. Therefore, when the active device array substrate 100 and the opposite substrate 200 are integrated, a complex frame is not required to be designed to surround the display driving circuit 124. In other words, the touch display panel 1000 is able to have an even surface.

Furthermore, the touch-sensing device layer 106 and the active device array substrate 110 are disposed on the same substrate simultaneously in the present embodiment. Therefore, in the fabricating method of the touch display panel in the present embodiment, the attaching process is omitted, and issues or problems generated from the attaching process are, prevented. Accordingly, the fabricating method of the touch display panel in the present embodiment improves the yield of the fabrication for the touch display panel.

After the touch-sensing driving circuit 122 and the display driving circuit 124 are formed, the fabrication of the touch display panel 1000 is completed.

FIG. 8 is illustrated to explain the structure of the touch display panel 1000 in detail.

As showing in FIG. 8, the touch display panel 1000 includes the active device array substrate 100, the opposite substrate 200, and the liquid crystal layer 300. The active device array substrate 100 includes the first substrate 102, the black matrix 104, the touch-sensing device layer 106, the dielectric layer 108, and the active device array layer 110.

The black matrix 104 is disposed over the first substrate 102. The black matrix 104 includes a mesh pattern 104a and a frame pattern 104b, wherein the frame pattern 104b surrounds the mesh pattern 104a.

The touch-sensing device layer 106 is disposed on the first substrate 102, which covers a portion of the black matrix 104. In detail, the touch-sensing device layer 106 physically covers the mesh patterns 104a of the black matrix 104 entirely. According to the present embodiment, the touch-sensing device layer 106 includes the first sensing series 106a, the second sensing series 106c, and the dielectric layer 106b, the dielectric layer 106b is disposed between the first sensing series 106a and the second sensing series 106c, and the first sensing array 106a is interlaced with the second sensing array 106c, as showing in FIG. 6.

The dielectric layer 108 covers the touch-sensing device layer 106, and the active device array layer 110 is disposed on the dielectric layer 108, wherein the touch-sensing device layer 106 and the active device array 110 are located at the two opposite sides of the dielectric layer. It should be noted that the dielectric layer 108 is disposed between the touch-sensing device layer 106 and the active device array layer 110, and the dielectric layer 108 may be made of materials with low dielectric constants. Therefore, the dielectric layer 108 may be utilized to reduce the noise interferences generated between the touch-sensing device layer 106 and the active device array layer 110. In addition, the dielectric layer 108 may provide an even surface to facilitate the fabrication process of films that are formed subsequently.

The active device array layer 110 includes a plurality of pixels 112 arranged in array, a plurality of scan lines 114, and a plurality of data lines 116, wherein each of the pixels 112 is electrically connected with the corresponding scan lines 114 and the data lines 116 respectively, as shown in FIG. 6. According to the present embodiment, the pixels 112 includes an active device 112a and a pixel electrode 112b, wherein the active device 112a is electrically connected to the corresponding scan lines 114 and the data lines 116.

The opposite substrate 200 includes the second substrate 202, the color filter layer 204, the protection layer 206, and the common electrode 208.

The color filter layer 204 is disposed on the second substrate 202. The color filter layer 204 includes a plurality of color filter patterns, and the black matrix can be optionally formed over the second substrate 202, wherein the color filter patterns are arranged in array. According to the present embodiment, the color filter patterns may distribute corresponding to the pixels 112 of the active device array substrate 110. In detail, each of the color filter patterns is distributed corresponding to one of the pixels 112, respectively.

The protection layer 206 covers the color filter layer 204. The protection layer 206 may be configured to protect the color filter layer 204 from damages caused by the following fabrication process. Furthermore, the protection layer 206 may provide an even interface to facilitate the fabrication process of films that are formed subsequently.

The common electrode 206 is disposed over the color filter layer 204, wherein the common electrode 206 and the second substrate 202 are located at two opposite sides of the color filter layer 204. The common electrode 206 and the pixel electrode 112b of the active device array layer 110 may be configured to provide electric field to drive the liquid crystal layer 300, and thus the required image is displayed on the touch display panel 1000.

Furthermore, the touch display panel 1000 in the present embodiment further includes the backlight module 400. The backlight module 400 is disposed at one side of the opposite substrate 200. In other words, the light emitted from the backlight module 400 transmits the opposite substrate 200 and the active device array substrate 100 sequentially and an image is generated and viewed by users' eyes. Since the active device array layer 110 is disposed on the first substrate 102 which is used as a carrying substrate and a covering substrate simultaneously, and the display driving circuit 124 is disposed on the active device array substrate 100, the frame of the present embodiment that is configured to integrate the active device array substrate 100 and the opposite substrate 200 together may have an even surface.

In the present embodiment, the scan lines 114 and the data lines 116 may cause light reflection. In order to cover the scan lines 114 and the data lines 116, the black matrix 104 is disposed on the active device array substrate 100 rather than the color filter layer 204, and the black matrix 104 is distributed corresponding to the scan lines 114 and the data lines 116. For example, the width of the mesh pattern 104a equals to the widths of the scan lines 114 and the data lines 116 physically, or the width of the mesh pattern 104a is slightly greater than the widths of the scan lines 114 and the data lines 116. In other words, the principle is for the width of the mesh pattern 104a to be able to cover the width of the scan lines 114 and the data lines 116.

The Second Exemplary Embodiment

Figure 9:
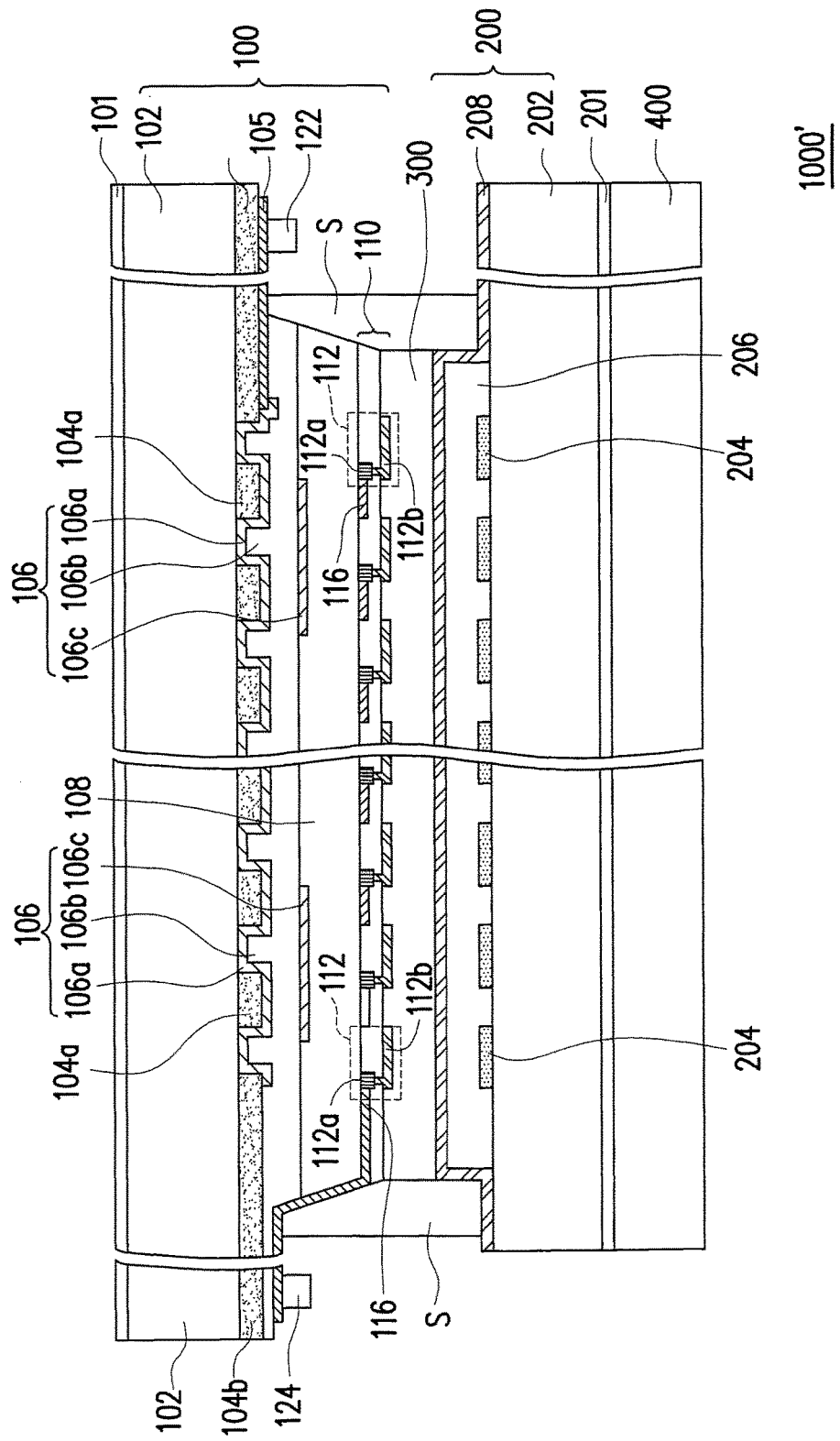
FIG. 9 is a schematic diagram of fabricating method of the touch display panel according to a second embodiment of the invention.

FIG. 9 is a diagram of fabrication process for the touch display panel. Referring to FIG. 9, in the present embodiment, a first polarizer 101 is attached on the first substrate 102 and a second polarizer 201 is attached on the second substrate 200. At this time, the fabrication of another type of touch display panel 1000' is completed.

FIG. 9 is illustrated to explain the structure of the touch display panel 1000' in detail.

Referring to FIG. 9, the structure of the touch display panel 1000' is similar to the touch display panel 1000 in the FIG. 8 except that the touch display panel 1000' further includes the first polarizer 101 and the second polarizer 201. The first polarizer 101 and the second polarizer 201 are disposed on the first substrate 102 and the opposite substrate 200 respectively, wherein the first polarizer 101 and the black matrix 104 are located at the two opposite sides of the first substrate 102, and the second polarizer 201 and the liquid crystal layer 300 are located at the two opposite sides of the substrate 200. In the present embodiment, the area of the first polarizer 101 is greater than the area of the second polarizer 201. Furthermore, the area of the first substrate 102 is greater than the area of the second substrate 202, which enables the first substrate 102 to have an adequate area to carry the touch-sensing driving circuit 122 and display driving circuit 124. However, the embodiment of the invention is not limited thereto.

In summary, the present disclosure disposes the touch-sensing device layer, the black matrix, and the active device array layer on the first substrate which is used as a covering plate and a carrying substrate. Therefore, the thickness and weight of the touch display panel are reduced, and the touch display has an even surface. In addition, the disclosure integrates the touch-sensing device layer and the active device array on the same substrate, hence the attaching process is reduced, and issues or problems generated from the attaching process are prevented. Accordingly, the fabricating method of the touch display panel in the present embodiment improves the yield of the fabrication for the touch display panel comparing to the conventional technology. Furthermore, the mesh pattern of the black matrix correspond to the distribution of the scan lines and the data lines of the active device array layer, which is able to cover the reflection caused by the scan lines and the data lines to ensure the display quality of the touch display panel.

Although the present invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A touch display panel, comprising:
   an active device array substrate, comprising:
   a first substrate;
   a black matrix, disposed on and directly in contact with the first substrate;
   a touch-sensing device layer, disposed on the first substrate to cover a portion of the black matrix, the touch-sensing device layer comprises:
      a plurality of first sensing series, wherein a side of the plurality of first sensing series is directly in contact with both the black matrix and a surface of the first substrate, and the black matrix is sandwiched between the first sensing series and the first substrate;
      a plurality of second sensing series; and
      an insulation layer, disposed between the plurality of first sensing series and the plurality of second sensing series;
   a dielectric layer, disposed on and covering the touch-sensing device layer, wherein the dielectric layer is directly in contact with the touch-sensing device layer; and
   an active device array layer, disposed on and directly in contact with the dielectric layer, the touch-sensing device layer and the active device array layer are located at two opposite sides of the dielectric layer, wherein the active device array layer is electrically connected to a display driving circuit;
   an opposite substrate, wherein the opposite substrate comprises:
      a second substrate; and
      a color filter layer, disposed on the second substrate; and
   a liquid crystal layer, disposed between the active device array layer and the color filter layer.

2. The touch display panel as claimed in claim 1, wherein the opposite substrate further comprises:
   a common electrode, disposed over the color filter layer, wherein the common electrode and the second substrate are located at the two opposite sides of the color filter layer.

3. The touch display panel as claimed in claim 1, wherein the active device array layer comprises a plurality of pixels arranged in an array, a plurality of scan lines and a plurality of data lines, each of the pixels is electrically connected to the corresponding scan lines and the data lines respectively, and the black matrix comprises a mesh pattern and a frame pattern, the frame pattern surrounds the mesh pattern, and the mesh pattern is distributed corresponding to the scan lines and the data lines.

4. The touch display panel as claimed in claim 1, wherein the display driving circuit is disposed on the black matrix.

5. The touch display panel as claimed in claim 1, further comprising a backlight module disposed at one side of the opposite substrate, wherein the backlight module and the active device array substrate are located at the two opposite sides of the opposite substrate.

6. The touch display panel as claimed in claim 1, wherein the plurality of second sensing series are directly in contact with the insulation layer and the insulation layer is disposed between the plurality of first sensing series and the plurality of second sensing series such that the plurality of first sensing series and the plurality of second sensing series are disposed on different planes, and at least part of the plurality of first sensing series is overlapped with the plurality of second sensing series.

7. The touch display panel as claimed in claim 1, wherein the black matrix further comprises a mesh pattern and a frame pattern, the mesh pattern comprises a plurality of protrusions, the plurality of first sensing series is disposed between each of the protrusions of the mesh pattern such that at least part of the plurality of first sensing series and the mesh pattern are disposed on the same plane, and another part of the plurality of first sensing series is overlapped with the mesh pattern.

* * * * *